US008121779B2

(12) United States Patent
Kon et al.

(10) Patent No.: US 8,121,779 B2
(45) Date of Patent: Feb. 21, 2012

(54) INFORMATION PROCESSING APPARATUS, INFORMATION PROVIDING METHOD, PROGRAM, AND INFORMATION PROVIDING SYSTEM

(75) Inventors: Takayasu Kon, Tokyo (JP); Yasunori Kamada, Kanagawa (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 12/331,020

(22) Filed: Dec. 9, 2008

(65) Prior Publication Data

US 2009/0157298 A1    Jun. 18, 2009

(30) Foreign Application Priority Data

Dec. 12, 2007  (JP) ................................. 2007-321309

(51) Int. Cl.
*G01C 21/00* (2006.01)
(52) U.S. Cl. ................................. 701/201; 701/9; 701/7
(58) Field of Classification Search .................. 701/207, 701/209, 200, 201; 455/456.5, 414.2, 432.3; 705/14.52, 9, 7; 1/1
See application file for complete search history.

(56) References Cited

U.S. PATENT DOCUMENTS

| | | | |
|---|---|---|---|
| 5,585,220 A | 12/1996 | Breyta et al. | |
| 5,623,194 A * | 4/1997 | Boll et al. ...................... | 320/137 |
| 6,850,893 B2 * | 2/2005 | Lipkin et al. ...................... | 705/8 |
| 7,152,038 B2 * | 12/2006 | Murashita et al. ................ | 705/5 |
| 7,369,938 B2 * | 5/2008 | Scholl ........................... | 701/207 |
| 7,742,931 B2 * | 6/2010 | McElwain Miller .............. | 705/2 |
| 2003/0027558 A1 * | 2/2003 | Eisinger ........................ | 455/414 |
| 2006/0016877 A1 | 1/2006 | Bonalle et al. | |
| 2007/0239724 A1 * | 10/2007 | Ramer et al. .................... | 707/10 |
| 2009/0152344 A1 | 6/2009 | Kamada et al. | |
| 2009/0187597 A1 | 7/2009 | Kamada et al. | |
| 2009/0199105 A1 | 8/2009 | Kamada et al. | |

FOREIGN PATENT DOCUMENTS

| | | |
|---|---|---|
| JP | 54-156600 A | 12/1979 |
| JP | 07-036657 A | 2/1995 |
| JP | 09-091352 A | 4/1997 |
| JP | 09-251502 A | 9/1997 |
| JP | 11-076620 A | 3/1999 |
| JP | 2000-242717 A | 9/2000 |
| JP | 2000-306162 A | 11/2000 |
| JP | 2001-147132 A | 5/2001 |
| JP | 2001-174273 A | 6/2001 |
| JP | 2001-252481 A | 9/2001 |
| JP | 2002-098537 A | 4/2002 |
| JP | 2002-278993 A | 9/2002 |
| JP | 2002-350153 A | 12/2002 |
| JP | 2002-366862 A | 12/2002 |

(Continued)

*Primary Examiner* — Thomas G. Black
*Assistant Examiner* — Marthe Marc-Coleman
(74) *Attorney, Agent, or Firm* — Wolf, Greenfield & Sacks, P.C.

(57) ABSTRACT

There is provided an information processing apparatus capable of communicating with an information management apparatus storing service information including place information, service content information, and start time information; the information processing apparatus including a communication portion; a position measurement portion for generating positional information; a data acquiring portion for acquiring, based on an input search condition, service information satisfying the search condition from the information management apparatus; and a list generating portion for generating a presentation list recorded with information on a service providing place capable of receiving the service at a provision start time based on the positional information, the place information and the start time information of the acquired service information, and time information defining a time the positional information is generated.

13 Claims, 4 Drawing Sheets

FOREIGN PATENT DOCUMENTS

| | | |
|---|---|---|
| JP | 2003-030449 A | 1/2003 |
| JP | 2003-288515 A | 10/2003 |
| JP | 2003-302240 A | 10/2003 |
| JP | 2003-308434 A | 10/2003 |
| JP | 2004-005502 A | 1/2004 |
| JP | 2004-077335 A | 3/2004 |
| JP | 2004-102381 A | 4/2004 |
| JP | 2004-193995 A | 7/2004 |
| JP | 2005-144191 A | 6/2005 |
| JP | 2006-170814 A | 6/2006 |
| JP | 2006-301955 A | 11/2006 |
| JP | 2007-233491 A | 9/2007 |
| JP | 2007-257168 A | 10/2007 |
| JP | 2007-269268 A | 10/2007 |
| JP | 2007-316857 A | 12/2007 |
| KR | 20010044437 A | 6/2001 |

* cited by examiner

INFORMATION PROCESSING APPARATUS, INFORMATION PROVIDING METHOD, PROGRAM, AND INFORMATION PROVIDING SYSTEM

CROSS REFERENCES TO RELATED APPLICATIONS

The present invention contains subject matter related to Japanese Patent Application JP 2007-321309 filed in the Japan Patent Office on Dec. 12, 2007, the entire contents of which being incorporated herein by reference.

BACKGROUND OF THE INVENTION

1. Field of the Invention

The present invention relates to an information processing apparatus, an information providing method, a program, and an information providing system.

2. Description of the Related Art

In recent years, navigation systems for directing a user to the destination such as car navigation system, and navigation system usable on mobile telephones and computers such as PC (Personal Computer) have been widely used.

In such navigation systems of the related art, the equipment configuring the navigation system directs the user to the destination when the user instructs the destination. However, the navigation systems of the related art are not able to direct the user unless the address, the name of the building, and the like are specified, that is, unless the destination is not uniquely defined.

A technique of searching for store information adapted to the search condition based on the input search condition in cooperation with transfer guidance information and map information has been developed. With the search condition being information related to time, the technique of searching for usable store information adapted to the search condition in cooperation with the transfer guidance information and the map information is disclosed in Japanese Patent Application Laid-Open No. 2004-5502 and the like.

SUMMARY OF THE INVENTION

The technique of the related art of searching for the store information adapted to the search condition based on the input search condition in cooperation with the transfer guidance information and the map information targets on searching eating and drinking places and the like that provide services regardless of the time the user arrives as long as it is during opening hours. The service provided in the real world is not limited to services provided regardless of the time the user arrives as long as it is during opening hours. For instance, there are many services in the real world such as films provided in cinemas, concerts held in concert halls, or events held in event halls that when a provision start time is defined in advance on contents, events, and the like provided as a service at a service providing place, the point of being serviced fades if later than the provision start time.

However, the technique of the related art of searching for the store information adapted to the search condition based on the input search condition in cooperation with the transfer guidance information and the map information does not take into consideration services in which the point of being serviced fades if later than the provision start time (i.e., services where provision start time has an important meaning). Therefore, even if the user uses the apparatus applied with the technique of the related art to perform the search, and the user heads to the service providing place based on the search result, the apparatus applied with the technique of the related art may not direct the user by the provision start time of the service provided at the service providing place.

The present invention is provided in view of the above-described issues, and it is desirable to provide a new and improved information processing apparatus, an information providing method, a program, and an information providing system for providing information on the service providing place adapted to the search condition capable of receiving the service at a provision start time of the service based on the input search condition and the provision start time of the service.

According to an embodiment of the present invention, there is provided an information processing apparatus capable of communicating with an information management apparatus storing service information including place information defining a service providing place where a service is provided, service content information defining a content of a content provided at the service providing place or a content of an event held at the service providing place, and start time information defining a provision start time of the content provided at the service providing place or the event held at the service providing place; the information processing apparatus including a communication portion for communicating with the information management apparatus; a position measurement portion for measuring a position and generating positional information; a data acquiring portion for acquiring, based on an input search condition, service information satisfying the search condition from the information management apparatus; and a list generating portion for generating a presentation list recorded with information on a service providing place capable of receiving the service at a provision start time based on the generated positional information, the place information and the start time information of the acquired service information, and time information defining a time the positional information is generated.

According to such configuration, the information on the service providing place adapted to the search condition capable of receiving the service at the provision start time of the service is provided based on the input search condition and the provision start time of the service.

The list generating portion may include a candidate list generating portion for generating a candidate list in which the place information and the service content information of the service providing place adapted to the search condition are recorded for every service providing place based on the acquired service information; a path searching portion for searching a travel path from a position indicated by the positional information to the service providing place indicated by the place information based on the positional information and the place information for every service providing place contained in the candidate list; an arrival time calculating portion for calculating an arrival time of arriving at the service providing place for every travel path based on the searched travel path; and a presentation list generating portion for setting a travel path, an arrival time, and a service start time capable of receiving the service at the provision start time for every service providing place contained in the candidate list based on the calculated arrival time and the start time information of the acquired service information, and generating the presentation list.

According to such configuration, the information on the service providing place adapted to the search condition capable of receiving the service at the provision start time of the service is provided based on the input search condition and the provision start time of the service, and the user can be directed to the relevant service providing place.

The presentation list generating portion may include a first setting portion for selecting the travel path and the arrival time for every service providing place based on the arrival time calculated in the arrival time calculating portion, and setting the selected travel path and the arrival time in the candidate list; and a second setting portion for setting a service start time capable of receiving the service at the provision start time in the candidate list based on the arrival time selected in the first setting portion and the start time information of the acquired service information.

According to such configuration, the information on the service providing place adapted to the search condition capable of receiving the service at the provision start time of the service is provided based on the input search condition and the provision start time of the service, and the user can be directed to the relevant service providing place.

The presentation list generating portion may further include a reordering portion for setting a priority based on the search condition, and reordering the information on the service providing place contained in the presentation list.

According to such configuration, a candidate list in which the information on the service providing place is reordered according to the search condition specified by the user can be generated.

The list generating portion may further include a supplementary information adding portion for acquiring information other than the service information corresponding to each service providing place contained in the presentation list as supplementary information from the information management apparatus, and adding the supplementary information to the information on the service providing place recorded in the presentation list.

According to such configuration, the selection of the service providing place by the user can be aided.

The list generating portion may further include a reservation information adding portion for acquiring availability data indicating an availability of the content or the event corresponding to the service start time of each service providing place contained in the presentation list from the information management apparatus, and adding reservation information indicating the availability to the information on the service providing place recorded in the presentation list based on the availability data.

According to such configuration, the selection of the service providing place by the user can be aided.

A reservation setting portion for making a reservation of the content or the event corresponding to the service start time of the service providing place contained in the presentation list may be further arranged.

According to such configuration, the user does not need to take into consideration the status of seat availability when moving to the service providing place, and can receive the service by simply going to the service providing place according to the presentation list.

A display portion for displaying the presentation list may be further arranged.

According to such configuration, the information on the service providing place adapted to the search condition capable of receiving the service at the provision start time of the service is provided based on the input search condition and the provision start time of the service.

An operation portion enabling input of the search condition may be further arranged.

According to such configuration, the search condition can be input.

A storage portion for storing the service information including place information defining a service providing place where a service is provided, service content information defining a content of a content provided at the service providing place or a content of an event held at the service providing place, and start time information defining a provision start time of the content provided at the service providing place or the event held at the service providing place may be further arranged; wherein the data acquiring portion may acquire the service information from the storage portion based on the input search condition if the service information is not acquired from the information management apparatus.

According to such configuration, the information on the service providing place adapted to the search condition capable of receiving the service at the provision start time of the service is provided based on the input search condition and the provision start time of the service even if communication is not established with the information management apparatus.

According to another embodiment of the present invention, there is provided an information providing method used in an information processing apparatus capable of communicating with an information management apparatus storing service information including place information defining a service providing place where a service is provided, service content information defining a content of a content provided at the service providing place or a content of an event held at the service providing place, and start time information defining a provision start time of the content provided at the service providing place or the event held at the service providing place; the information providing method including the steps of: acquiring, based on an input search condition, service information satisfying the search condition from the information management apparatus; measuring a position and generating positional information; and generating a presentation list recorded with information on a service providing place capable of receiving the service at a provision start time based on the generated positional information, the place information and the start time information of the acquired service information, and time information defining a time the positional information is generated.

Through the use of such method, the information on the service providing place adapted to the search condition capable of receiving the service at the provision start time of the service can be provided based on the input search condition and the provision start time of the service.

According to another embodiment of the present invention, there is provided a program used in an information processing apparatus capable of communicating with an information management apparatus storing service information including place information defining a service providing place where a service is provided, service content information defining a content of a content provided at the service providing place or a content of an event held at the service providing place, and start time information defining a provision start time of the content provided at the service providing place or the event held at the service providing place; the program causing a computer to execute the steps of: acquiring, based on an input search condition, service information satisfying the search condition from the information management apparatus; measuring a position and generating positional information; and generating a presentation list recorded with information on a service providing place capable of receiving the service at a provision start time based on the generated positional information, the place information and the start time information of the acquired service information, and time information defining a time the positional information is generated.

According to such program, the information on the service providing place adapted to the search condition capable of receiving the service at the provision start time of the service is provided based on the input search condition and the provision start time of the service.

According to another embodiment of the present invention, there is provided an information providing system including an information management apparatus and an information processing apparatus capable of communicating with the information management apparatus; wherein the information management apparatus includes a management side communication portion for communicating with the information processing apparatus, a storage portion for storing service information including place information defining a service providing place where a service is provided, service content information defining a content of a content provided at the service providing place or a content of an event held at the service providing place, and start time information defining a provision start time of the content provided at the service providing place or the event held at the service providing place, a data extracting portion for extracting service information from the storage portion based on an acquisition request transmitted from the information processing apparatus, and a data transmission control portion for transmitting the extracted service information to the information processing apparatus; and the information processing apparatus includes a communication portion for communicating with the information management apparatus, a position measurement portion for measuring a position and generating positional information, a data acquiring portion for, based on an input search condition, transmitting the acquisition request of the service information corresponding to the search condition to the information management apparatus, and acquiring the service information corresponding to the acquisition request from the information management apparatus, and a list generating portion for generating a presentation list recorded with information on a service providing place capable of receiving the service at a provision start time based on the generated positional information, the place information and the start time information of the acquired service information, and time information defining a time the positional information is generated.

According to such configuration, the information on the service providing place adapted to the search condition capable of receiving the service at the provision start time of the service can be provided based on the input search condition and the provision start time of the service.

According to the embodiments of the present invention described above, information on the service providing place adapted to the search condition capable of receiving the service at the provision start time of the service can be provided based on the input search condition and the provision start time of the service.

DETAILED DESCRIPTION OF THE PREFERRED EMBODIMENTS

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

(Information Providing System According to Embodiment of the Present Invention)

Figure 1:
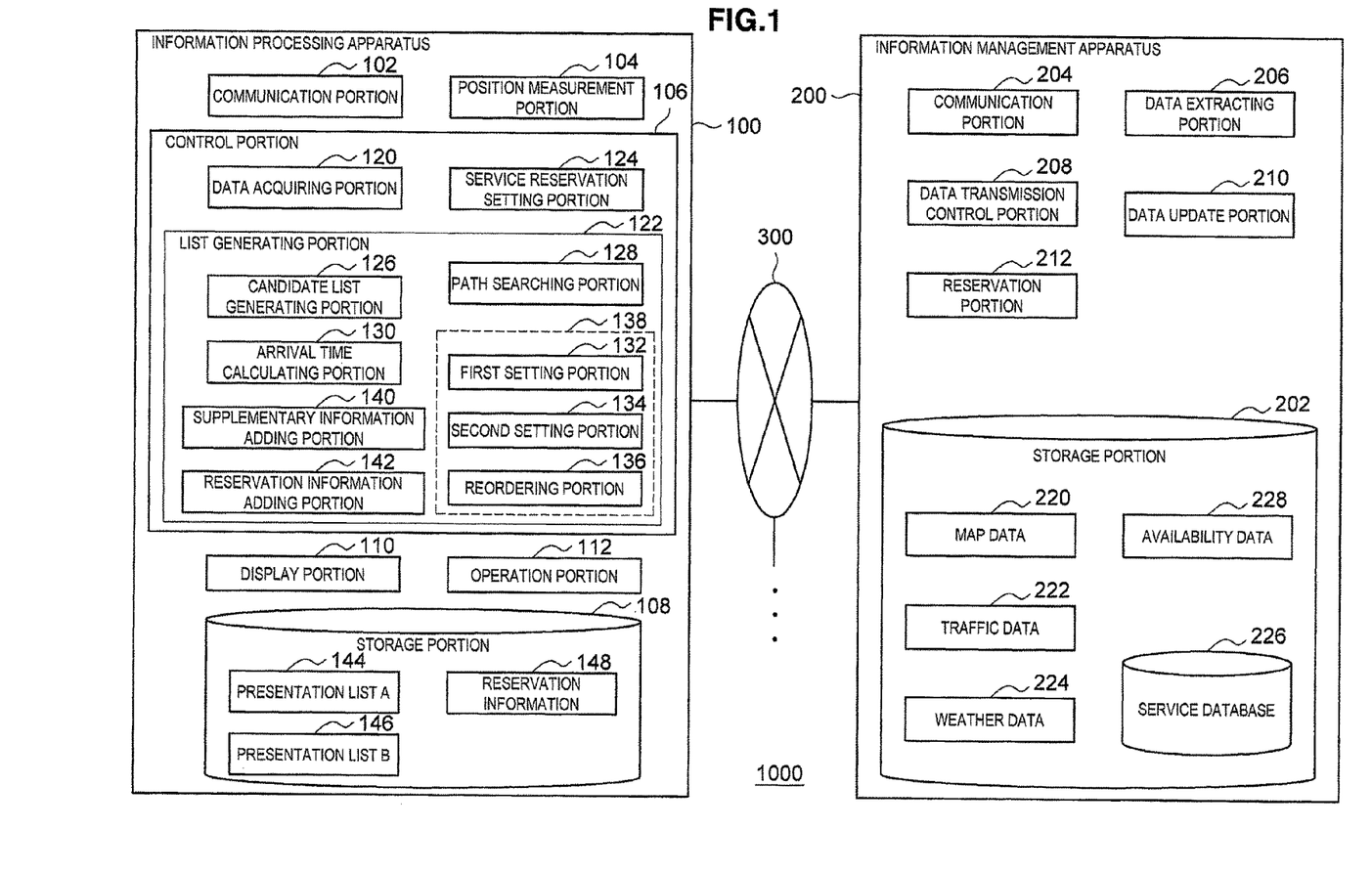
FIG. 1 is a block diagram showing an information providing system according to an embodiment of the present invention.

FIG. 1 is a block diagram showing an information providing system 1000 according to an embodiment of the present invention. With reference to FIG. 1, the information providing system 1000 includes an information management apparatus 200, and at least one or more information processing apparatus 100, . . . connected to the information management apparatus 200, where each information processing apparatus and the information management apparatus 200 are connected with a network 300.

The network 300 may be a wired network such as LAN (Local Area Network) and WAN (Wide Area Network); a wireless network such as WLAN (Wireless Local Area Network) using MIMO (Multiple-Input Multiple-Output); Internet using a communication protocol such as TCP/IP (Transmission Control Protocol/Internet Protocol) or the like, but is not limited thereto. Each information processing apparatus and the information management apparatus 200 may be connected by way of a wireless base station.

[Outline of Information Providing System 1000]

The information providing system 1000 provides to the user information on a service providing place adapted to a search condition based on a search condition specified by the user of the information processing apparatus 100, and a provision start time of the service.

The service according to the embodiment of the present invention mainly refers to that in which the provision start time is defined in advance to content, event, and the like provided as a service at the service providing place, and in which the meaning of receiving the service fades if not by the provision start time, that is, that in which the provision start time has an important meaning. The service according to the embodiment of the present invention includes those providing content such as film showing, film concert, video viewing and the like provided in cinemas, concert held in concert halls, event held in event halls such as sport competitions, and the like, but is not limited thereto.

A film showing service provided in the cinema (service providing place) will be described by way example as a service according to the embodiment of the present invention.

In the information providing system 1000, the information processing apparatus 100 provides the information on the service providing place to the user by performing the following processes (1) to (4).

(1) Determine Search Condition

The information processing apparatus 100 determines the search condition by having the user specify the search condition. The information processing apparatus 100 includes a position measurement portion 104 (to be hereinafter described) for generating positional information specifying the position of the information processing apparatus 100 by measuring the position of the information processing apparatus 100. Therefore, the information processing apparatus 100 can specify the position of the information processing apparatus 100 by using the position measurement portion 104, and the specified position can be used, for example, as a current position described below.

The search condition according to the embodiment of the present invention includes the following (1-1) to (1-4). It should be recognized that the search condition according to the embodiment of the present invention is not limited to the following (1-1) to (1-4). The search condition described below may be presented to the user in a list format by the information processing apparatus 100 and selected by the user, or may be directly input in the input format by the user.

(1-1) Selection Condition Related to Content (Service Content)

Title of the Film

Genre of the film (e.g., based on production region such as Japanese film, American film, European film, and Asian film/based on content of the film such as action, romance, comedy, horror, suspense, and human drama)

Arbitrary (e.g., automatic selection condition by box-office rating, ranking, and the like)

(1-2) Search Condition Related to Service Providing Place

Physical distance from the current position (e.g., within 3 Km, within 10 Km, and the like)

Distance from the nearest station (example of nearest public transport stopping place) (e.g., within 100 m, within 500 m and the like)

Area (e.g., city, metropolitan sphere, urban and the like)

Facility, equipment (e.g., presence of day-care center, presence of parking, audio equipment, film showing system, size of screen, and the like)

No specification (1-3) Search Condition Related to Provision Start Time

Specification of the provision start time (e.g., 13:00, 17:00, and the like)

Specification of time zone (e.g., 13:00 to 14:00, and the like)

Viewable in minimal length

No specification (1-4) Other Search Conditions

Specification of moving time from the current position to the service providing place (e.g., within 30 minutes, within one hour, no specification, and the like)

Specification of transportation means (e.g., with or without use of bicycle, with or without of use of automobile, with or without of use of bus, with or without of use of train, no specification, and the like)

Specification of consideration of weather (e.g., with or without consideration of weather in the travel path to the service providing place, no specification, and the like)

Specification of availability check (e.g., presence of vacant seat check, no specification, and the like)

Specification of presence of supplementary information search (2) Acquire Service Information The information processing apparatus 100 acquires the service information adapted to the search condition specified by the user from the information management apparatus 200.

Here, the service information includes "place information" defining the service providing place where the service is provided, "service content information" defining the content of the content provided at the service providing place or the content of the event held at the service providing place, and "start time information" defined with the provision start time of the content provided at the service providing place or the event held at the service providing place (e.g., information on time table). The information contained in the service information according to the embodiment of the present invention is not limited to the "place information", the "service content information", and the "start time information". The service information according to the embodiment of the present invention may also include "end time information" defined with the provision end time of the content provided at the service providing place or the event held at the service providing place.

(3) Generation of Presentation List

Figure 2:
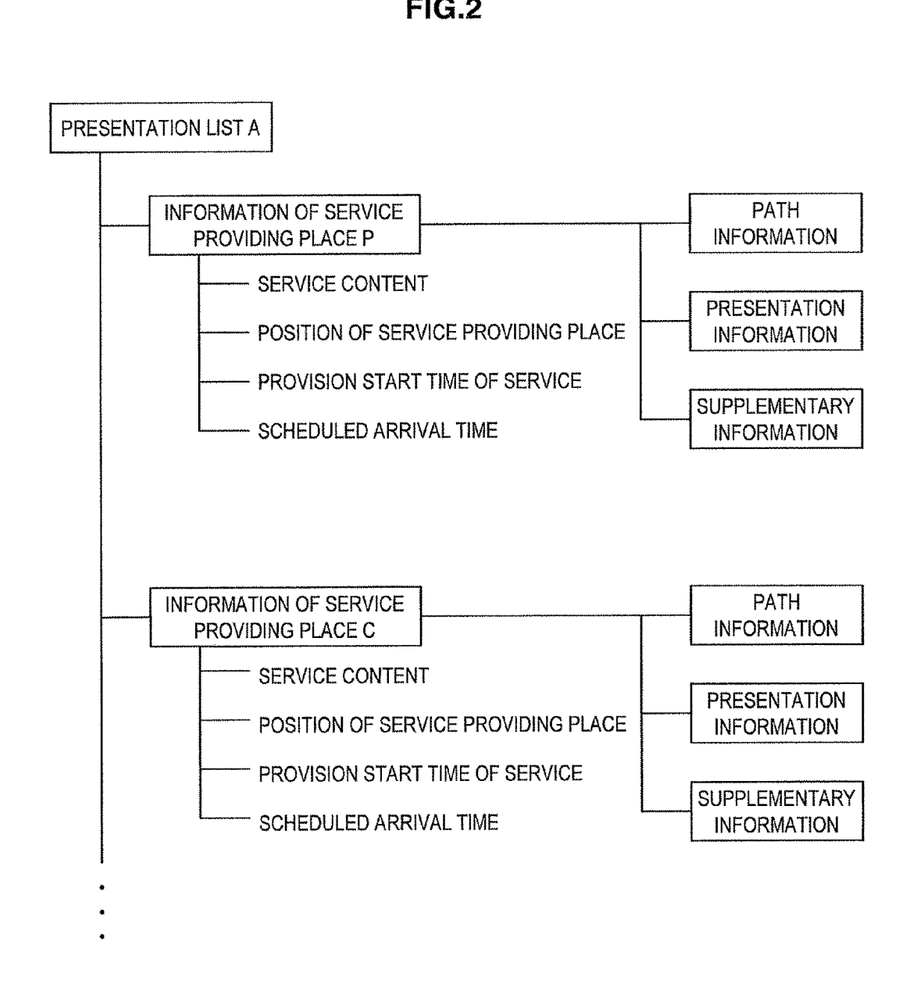
FIG. 2 is an explanatory view showing a configuration example of a presentation list according to the embodiment of the present invention.

The information processing apparatus 100 generates a presentation list used to show the information to the user based on the service information acquired from the information management apparatus 200, the positional information generated by the position measurement portion 104, and the search condition determined in (1). FIG. 2 is an explanatory view showing a configuration example of the presentation list according to the embodiment of the present invention.

With reference to FIG. 2, the presentation list according to the embodiment of the present invention is recorded with the information on the service providing place adapted to the search condition for every service providing place. For instance, FIG. 2 shows an example where information on a service providing place P, information on a service providing place C, . . . are recorded as the information on the service providing place.

In FIG. 2, an example where information with different service providing places are recorded in the presentation list such as the information on the service providing place C and the information on the service providing place P is shown, but the presentation list according to the embodiment of the present invention is not limited thereto. For instance, if a plurality of films (content) is being shown at one service providing place such as in a cinema complex (multiplex theater), the presentation list may be recorded with the information indicating the same service providing place for every provided content.

The display order of the information on the service providing place recorded in the presentation list can be determined based on the priority set when generating the list. The information processing apparatus 100 may set the priority based on the search condition.

For instance, the travel path to a certain service providing place includes a walking route on which the user travels by walking if the condition of "consider weather in the travel path to the service providing place" is specified as the search condition, and the priority of the service providing place is lowered if the weather of the region including the walking route is raining (or precipitation percentage is greater than or equal to predetermined threshold value).

The information processing apparatus 100 can set the weighting of the priority on each search condition. The information processing apparatus 100 can preferentially display the information on the service providing place adapted to the search condition of greater weighing by setting the weighing of the priority on each search condition.

The order of the information on the service providing place recorded in the presentation list is not limited to being determined based on the priority, and the order of the information on the service providing place recorded in the presentation list may be the searched order.

The information processing apparatus 100 presents the service content, the position of the service providing place, the provision start time of the service, and the scheduled arrival time, as shown in FIG. 2, as the information on the service providing place, but is not limited thereto.

In the service content, the title of the film and the like are presented based on the "service content information" of the service information acquired from the information management apparatus 200. At the position of the service providing place, the nearest station, the schematic travel method from the nearest station, and the necessary time (e.g., 3 minutes by walk from O ■ ● station, and the like) are presented based on the "place information" of the service information. The provision start time of the service is presented based on the "start time information" of the service information. At the scheduled arrival time, the scheduled time of arriving at the service providing location is presented. The scheduled arrival time can be calculated by having the information processing apparatus 100 acquire map data (hereinafter described), traffic data (hereinafter described), and the like from the information management apparatus 200, and the information processing apparatus 100 can calculate the scheduled arrival time through path search using the positional information generated by the position measurement portion 104 and the acquired data.

The information processing apparatus 100 can generate the presentation list having hierarchical structure, and can further add other information to the lower layer of the information on the service providing place. In FIG. 2, a case where path information, reservation information, and supplementary information are added is shown, but the information to be added are not limited thereto.

Here, the path information is information based on the result of the path search performed in the calculation of the scheduled arrival time, and the travel path from the position where the search condition is determined to the service providing location is presented using characters or graphics in which the path is displayed on a map. The availability of the content provided at the service providing location is presented as the reservation information. The supplementary information may be information on a certain facility in the service providing place, information on eating and drinking places close to the service providing place, and the like.

The information processing apparatus 100 can provide the information on the service providing place adapted to the search condition capable of being serviced at the provision start time of the service by generating the presentation list as shown in FIG. 2. The presentation list according to the embodiment of the present invention has a hierarchical structure, and thus can direct the user to the service providing place by adding the path information and the like to the information on the service providing place.

(4) Present Information on Service Providing Place

The information processing apparatus 100 presents the information on the service providing place adapted to the search condition to the user based on the presentation list generated in (3). When the information processing apparatus 100 shows the information on the service providing place adapted to the search condition to the user, the user can arrive at the service providing place by the provision start time of the service by going to the service providing place according to the presented information on the service providing place. Therefore, the information processing apparatus 100 can direct the user by the provision start time of the service provided at the service providing location adapted to the search condition.

In the above description, an example where the information processing apparatus 100 generates the presentation list as shown in FIG. 2, and presents the generated presentation list to the user has been described, but is not limited thereto. For instance, the information processing apparatus 100 according to the embodiment of the present invention may record each service providing location information shown in FIG. 2 in different files, and the user may select each file so that the information on each service providing place is presented to the user.

The information providing system 1000 according to the embodiment of the present invention provides the information on the service providing place to the user through the above processes (1) to (4).

If the user sets the specification of the title of the film and the specification of the physical distance of within 10 Km from the current position as search conditions, the information processing apparatus 100 generates a presentation list recorded with information (information on service providing place) of a cinema within 10 Km from the position where the search is made of the cinemas showing the specified film. The information on each cinema of the presentation list includes the tile of the film (correspond to "service content" of FIG. 2), outline of the position of the cinema (e.g., 3 minutes by walk from O ■ ● station etc., correspond to "position of service providing place" of FIG. 2), film showing start time of the film (e.g., 13:10—etc., correspond to "provision start time of the service" of FIG. 2), scheduled time of arriving at the cinema (e.g., 12:50 etc., correspond to "scheduled arrival time" of FIG. 2), and the travel path to the cinema (correspond to path information on FIG. 2). Therefore, the user can arrive at the relevant cinema (service providing place) by the film showing time (provision start time of the service), and enjoy the film from the beginning by moving to one of the cinemas according to the information on each cinema of the presentation list.

The information management apparatus 200, and the information processing apparatuses 100, . . . configuring the information providing system 1000 will be described below with reference again to FIG. 1. The information processing apparatus 100 will be described below as the information processing apparatus according to the embodiment of the present invention. Other information processing apparatuses have a configuration similar to the information processing apparatus 100, and thus the description thereof will be omitted.

[Information Management Apparatus 200]

The information management apparatus 200 includes a storage portion 202, a communication portion 204, a data extracting portion 206, a data transmission control portion 208, a data update portion 210, and a reservation portion 212.

The information management apparatus 200 is configured to include MPU (Micro Processing Unit), and the like, and may include a control portion (not shown) for controlling the entire information management apparatus 200 by performing various calculation processes using the control program and the like, a ROM (Read Only Memory; not shown) recorded with programs used by the control portion (not shown) and control data such as calculation parameter, a RAM (Random Access Memory; not shown) for primary storing programs etc. executed by the control portion (not shown), an operation portion (not shown) operable by the user of the information management apparatus 200, a display portion (not shown), and the like. The information management apparatus 200 connects each component with a bus serving as a data transmission path.

The operation portion (not shown) may be an operation input device such as keyboard and mouse, rotatable selector such as button, direction key, and jog dial, or a combination thereof, but is not limited thereto. The display portion (not shown) may be an LCD (Liquid Crystal Display), an organic EL display (Organic Electro-Luminescence Display or also referred to as OLED display (Organic Light Emitting Diode Display)), and the like, but is not limited thereto.

The storage portion 202 is a storage means arranged in the information management apparatus 200. The storage portion 202 is recorded with map data 220, traffic data 222, weather data 224, service database 226, and availability data 228.

The map data 220 is recorded with information on geography, latitude/longitude of each position and the like. The traffic data 222 is recorded with predefined route schedule information (e.g., information on time table) of each public transportation such as train and bus, information related to the route of the public transportation such as route delay information due to accident and traffic. The weather data 224 is recorded with information related to the weather of each region.

The service database 226 is recorded with service information and supplementary information corresponding to the service information. The service information includes information such as "place information", "service content information", "start time information", and the like described above. The supplementary information includes information on a certain facility in the service providing place, information on eating and drinking places near the service providing place, and the like, but is not limited thereto. In FIG. 1, an example where the service information is recorded in a database format in the storage portion 202 is shown, but is not limited thereto, and may be recorded in a file format.

The storage portion 202 may be a magnetic recording medium such as hard disk, or a non-volatile memory such as flash memory, but is not limited thereto.

The communication portion 204 communicates with each information processing apparatus such as the information processing apparatus 100 through the network 300. More specifically, the communication portion 204 receives an acquisition request of the service information transmitted from the information processing apparatus 100, and transmits the service information based on the acquisition request to the information processing apparatus 100. The acquisition request of the service information is generated by the information processing apparatus based on the search condition specified by the user input.

The communication portion 204 communicates with an external device (e.g., a server issuing route information owned by a company running each public transportation, server issuing information on the weather of each region owned by government and other public offices, server owned by the provider of each service, and the like) through the network 300, and can receive various information configuring the map data, the traffic data, the weather data, the service information, and the like.

The data extracting portion 206 searches the service database 226 of the storage portion 202 based on the acquisition request of the service information received by the communication portion 204, and extracts the service information adapted to the acquisition request. The data extracting portion 206 extracts the service information from the service database 226 by converting the acquisition request of the service information received by the communication portion 204 to a database language such as SQL, for example, but is not limited thereto.

The data transmission control portion 208 transmits the service information extracted by the data extracting portion 206 to the information processing apparatus which transmitted the acquisition request of the service information.

The data update portion 210 communicates with the external device through the communication portion 204, and updates the map data 220, the traffic data 222, the weather data 224, the service information on the service database 226, and the availability data 228 stored in the storage portion 202. Therefore, the information management apparatus 200 can maintain various information stored in the storage portion 202 to the latest state.

The reservation portion 212 communicates with the external device through the communication portion 204 based on a reservation request from the information processing apparatus, and reserves the service specified by the reservation request. The reservation portion 212 transmits the result of the reservation to the information processing apparatus. A configuration where the information management apparatus 200 includes the reservation portion 212 is shown in FIG. 1, but is not limited thereto. For instance, the reservation portion 212 may not be arranged if each information processing apparatus has a function of making the reservation on its own.

The information management apparatus 200 can transmit the service information adapted to the acquisition request of the service information transmitted from the information processing apparatus 100 to the information processing apparatus 100 by having the configuration described above.

[Information Processing Apparatus 100]

The information processing apparatus 100 according to the embodiment of the present invention will now be described.

The information processing apparatus 100 includes a communication portion 102, a position measurement portion 104, a control portion 106, a storage portion 108, a display portion 110, and an operation portion 112.

The information processing apparatus 100 may include a ROM (not shown) recorded with programs used by the control portion 106 and control data such as calculation parameter, a RAM (not shown) for primary storing programs etc. executed by the control portion 106, and the like. The information processing apparatus 100 connects each component with a bus serving as a data transmission path.

[Hardware Configuration Example of Information Processing Apparatus 100]

Figure 3:
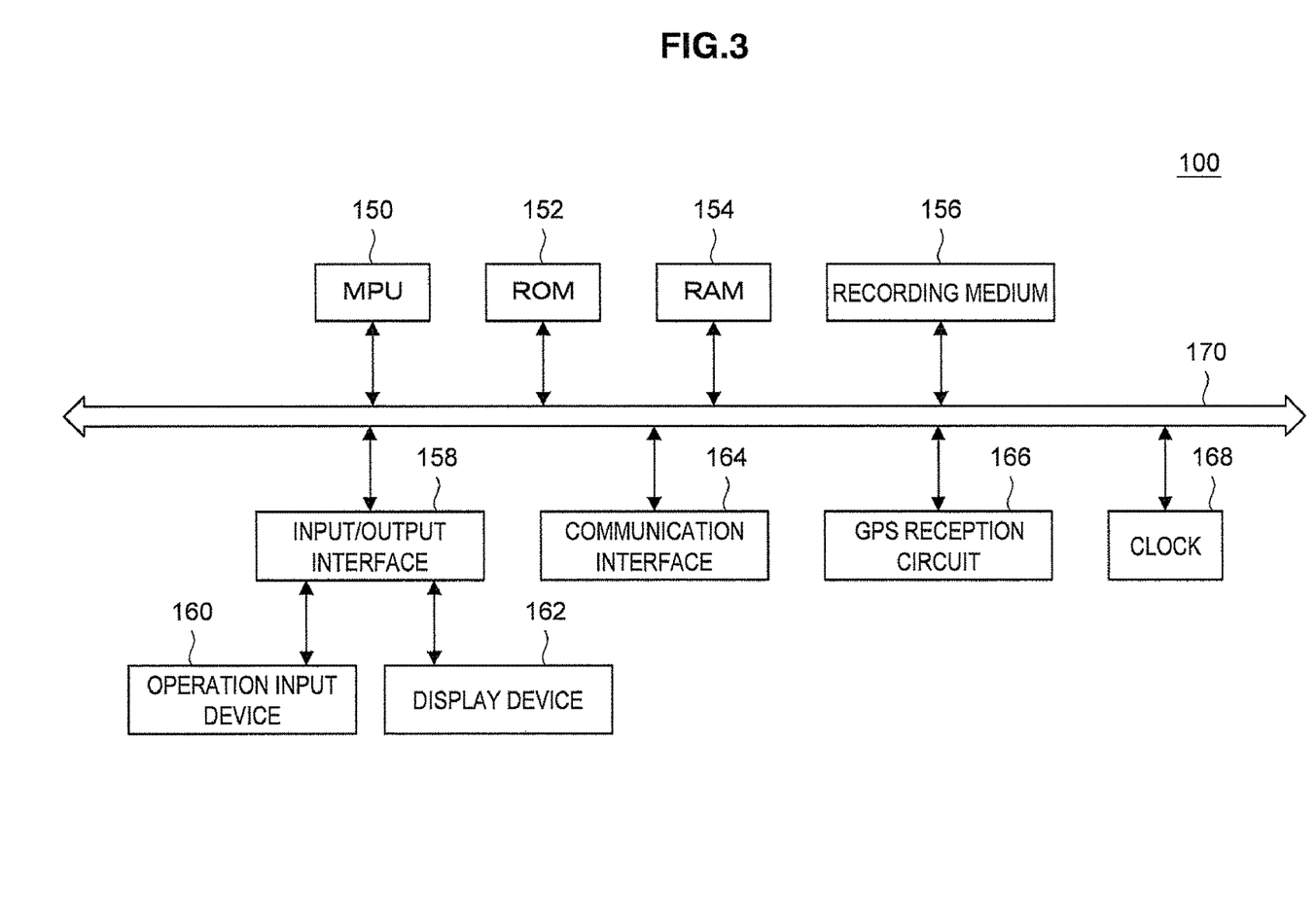
FIG. 3 is an explanatory view showing one example of a hardware configuration of the information processing apparatus according to the embodiment of the present invention.

FIG. 3 is an explanatory view showing one example of a hardware configuration of the information processing apparatus 100 according to the embodiment of the present invention. With reference to FIG. 3, the information processing apparatus 100 includes an MPU 150, a ROM 152, a RAM 154, a recording medium 156, an input/output interface 158, an operation input device 160, a display device 162, a communication interface 164, a GPS reception circuit 166, and a clock 168. The information processing apparatus 100 connects each component with a bus 170 serving as a data transmission path.

The MPU 150 functions as the control portion 106 of the information processing apparatus 100 for controlling the entire information processing apparatus 100. The ROM 152 stores the programs used by the MPU 150 and the control data such as calculation parameter, and the RAM 154 primary stores the program etc. executed by the MPU 150.

The recording medium 156 functions as the storage portion 108 of the information processing apparatus 100, and stores the generated presentation list, various data acquired from the information management apparatus 200 (e.g., map data and traffic data), application and the like. The recording medium 156 may be a magnetic recording medium such as hard disk, or a non-volatile memory such as EEPROM, flash memory, MRAM (Magnetoresistive Random Access Memory), FeRAM (Ferroelectric Random Access Memory), PRAM (Phase change Random Access Memory), and the like, but is not limited thereto.

The input/output interface 158 connects, for instance, the operation input device 160 and the display device 162. The input/output terminal 158 may be a USB (Universal Serial Bus) terminal, DVI (Digital Visual Interface) terminal, HDMI (High-Definition Multimedia Interface) terminal, and the like, but is not limited thereto. The operation input device 160 is arranged on the information processing apparatus 100, and the like, and is connected with the input/output interface 158 at the interior of the information processing apparatus 100. The operation input device 160 may be a rotatable selector such as button, direction key, and jog dial, or a combination thereof, but is not limited thereto. The display device 162 is arranged in the information processing apparatus 100, and is connected with the input/output interface 158 at the interior of the information processing apparatus 100. The display device 162 may be an LCD (Liquid Crystal Display), an organic EL display (Organic Electro-Luminescence Display or also referred to as OLED display (Organic Light Emitting Diode Display)), and the like, but is not limited thereto. It should be recognized that the input/output interface 158 can also be connected with the operation input device (e.g., keyboard and mouse) serving as an external device of the information processing apparatus 100, and the display device (e.g., external display etc.).

The operation input device 160 functions as the operation portion 112, and the display device 162 functions as the display portion 110.

The communication interface 164 is an interface for communicating with the external device, and functions as the communication portion 102. The communication interface 164 may be a LAN terminal, IEEE 802.11 port, and the like, but is not limited thereto.

The GPS reception circuit 166 receives an electric wave from a GPS satellite, specifies the position of the information processing apparatus 100 using the GPS (Global Positioning System), and generates positional information. The GPS reception circuit 166 functions as the position measurement portion 104 of the information processing apparatus 100.

The clock 168 generates time information used to specify the time the GPS reception circuit 166 generated the positional information, the time the search condition is determined in the information processing apparatus 100, and the like.

According to the hardware configuration shown in FIG. 3, the information processing apparatus 100 can provide information on the service providing place to the user by performing the processes (1) to (4) described above. It should be recognized that the hardware configuration of the information processing apparatus 100 according to the embodiment of the present invention is not limited to the configuration shown in FIG. 3.

With reference again to FIG. 1, each component of the information processing apparatus 100 will be described. The communication portion 102 communicates with the information management apparatus 200 through the network 300. More specifically, the communication portion 102 transmits the acquisition request of the service information to the information management apparatus 200, and receives the service information transmitted from the information management apparatus 200. Not limited to the service information such as the map data 220, the traffic data 222, and the weather data 224 stored in the information management apparatus 200, the communication portion 102 may receive various data transmitted from the information management apparatus 200.

The position measurement portion 104 measures the position of the information processing apparatus 100, and generates the positional information. The position measurement portion 104 may be the GPS reception circuit 166, but is not limited thereto. For instance, the information processing apparatus according to the embodiment of the present invention may generate the positional information by including an RF (Radio Frequency) circuit for receiving the electric wave from the base station as the position measurement portion 104.

The control portion 106 is configured to include the MPU and the like, and controls the entire information processing apparatus 100 by performing various calculation processes using the control program etc. recorded on the ROM (not shown). The control portion 106 includes a data acquiring portion 120, a list generating portion 122, and a service reservation setting portion 124. Each part of the control portion 106 will now be described.

[Control Portion 106]

The data acquiring portion 120 determines the search condition for generating the presentation list, and generates the acquisition request of the service information for acquiring the service information adapted to the determined search condition. The data acquiring portion 120 transmits the generated acquisition request of the service information to the information management apparatus 200 via the communication portion 102. The data acquiring portion 120 can determine the search condition based on an operation input signal transmitted from the operation portion 112 according to the user input.

The data acquiring portion 120 generates the acquisition request of the appropriate data in response to the request from the list generating portion 122, and transmits the same to the information management apparatus 200. The information processing apparatus 100 can acquire the service information and various data from the information management apparatus 200 by including the data acquiring portion 120.

The list generating portion 122 generates the presentation list as shown in FIG. 2 using the positional information generated by the position measurement portion 104, the search condition determined by the data acquiring portion 120, the service information acquired by the data acquiring portion 120 from the information management apparatus 200, and the like. The list generating portion 122 will be more specifically described below.

[Configuration Example of List Generating Portion 122]

The list generating portion 122 includes a candidate list generating portion 126, a path searching portion 128, an arrival time calculating portion 130, a first setting portion 132, a second setting portion 134, a reordering portion 136, a supplementary information adding portion 140, and a reservation information adding portion 142. The first setting portion 132, the second setting portion 134, and the reordering portion 136 configure a presentation list generating portion 138 for generating the presentation list.

The candidate list generating portion 126 generates a candidate list (not shown) that becomes the base of the presentation list based on the service information adapted to the search condition acquired by the data acquiring portion 120. The information on the service place adapted to the search condition is recorded in the candidate list in an arbitrary order.

The information on each service place of the candidate list is recorded with the information on the "service content", the "position of the service providing place", and the "provision start time of the service" shown in FIG. 2 based on the "place information", the "service content information", and the "start time information" of the acquired service information (first phase of generating the presentation list).

The path searching portion 128 searches the travel path from the position indicated by the positional information to the service providing place indicated by the place information based on the positional information generated by the position measurement portion 104 and the "place information" of the acquired service information. The path searching portion 128 acquires the map data and the traffic data from the information management apparatus 200 by causing the data acquiring portion 120 to generate the acquisition request, and searches for at least one travel path from the position of when the search condition is determined to the service providing place by the acquired map data and the traffic data, the positional information indicating the position of when the search condition is determined, and the information on the position of the service providing place indicated by the "place information".

More specifically, the path searching portion 128 combines the path search of (i) to (iii) below to search for the travel path from the position of when the search condition is determined to the service providing place. It should be recognized that the method of the path search according to the embodiment of the present invention is not limited to combining the path search of (i) to (iii).

(i) Search of travel path to a stop position (first stop position) of the public transportation existing within a predetermined range from the position of when the search condition is determined The path searching portion 128 performs the search based on the positional information and the map data.

(ii) Search of travel path from the first stop position to a stop position (second stop position) of the public transportation existing within a predetermined range from the position of the service providing place The path searching portion 128 performs the search based on the map data, the traffic data, and the "place information" of the service information.

(iii) Search of travel path from the second stop position to the position of the service providing place The path searching portion 128 performs the search based on the map data and the "place information" of the service information.

The path searching portion 128 searches for the travel path based on the determined search condition. For instance, if the condition of not using the bus is set for the search condition (one example of a case where the specification of the transportation means is made in the search condition), the path searching portion 128 does not select the bus stop as the first stop position, and does not search for the travel path using the bus. If the condition of taking into consideration a case when the weather is raining is set as the search condition (one example of a case where the specification of the condition related to weather is made in the search condition), the path searching portion 128 does search for the travel path in which the distance of walking outside is greater than or equal to a predetermined distance. It should be recognized that the processing of the path searching portion 128 when the specification of the transportation means is made in the search condition, or when the specification of the condition related to weather is made in the search condition is not limited to the above.

The path searching portion 128 can also check the operation state of the public transportation based on the traffic data, and can exclude the travel path using the public transportation that is out of service.

The path searching portion 128 can perform the search for the travel path for every service providing place contained in the candidate list.

The arrival time calculating portion 130 calculates the arrival time of arriving at each service providing place for every travel path based on the travel path to the service providing place contained in the candidate list searched in the path searching portion 128. The arrival time calculating portion 130 can calculate the arrival time of arriving at each service providing place for every travel path by combining the respective necessary time of (i) to (iii), but is not limited thereto. For instance, the arrival time calculating portion 130 checks the delay state of the public transportation based on the traffic data, and calculates the arrival time reflecting the relevant delay.

The first setting portion 132 selects the travel path in which the arrival time is the fastest for every service providing place contained in the candidate list based on the arrival time calculated by the arrival time calculating portion 130. The first setting portion 132 adds the selected travel path to the information on the corresponding service providing place of the candidate list, and records the arrival time corresponding to the travel path to the information on the service providing place. Therefore, the information on the "scheduled arrival time" shown in FIG. 2 and the "path information" are recorded in the candidate list (second phase of generating the presentation list).

In the above description, an example where the first setting portion 132 selects the travel path in which the arrival time is the fastest for every service providing place is shown, but is not limited thereto. For instance, the first setting portion according to the embodiment of the present invention can select the travel path and the arrival time corresponding to the travel path based on the calculated arrival time and the information on the transportation cost necessary for transfer (e.g., obtained by using traffic data).

The second setting portion 134 selects the service start time capable of receiving the service at the provision start time from the "start time information" for every service providing place contained in the candidate list based on the arrival time selected by the first setting portion 132 and the "start time information" of the acquired service information. As described above, if plural films are being shown at one place as in a cinema complex, the information on the same service providing place is recorded for every film (content) shown in the candidate list. In the above case, the second setting portion 134 can select the service start time for every service providing place contained in the candidate list (more specifically, for every service providing place and the provided service).

The second setting portion 134 records the selected service start time in the information on the service providing place. Therefore, the "provision start time of the service" shown in FIG. 2 is recorded in the candidate list (third phase of generating the presentation list).

The list generating portion 122 can generate the presentation list recorded with the information on the service providing place capable of receiving the service at the provision start time through the second phase of generating the presentation list performed by the first setting portion 132, and the third phase of generating the presentation list performed by the second setting portion 134. Therefore, the candidate list after the third phase of generating the presentation list can be considered as the presentation list.

The reordering portion 136 sets the priority based on the search condition with respect to the information on each providing location of the candidate list recorded with the information on the service providing place by the second setting portion 134, and reorders (sorts) the information on the providing place based on the set priority. If the search condition of considering the case where the weather is raining is specified by the user, the reordering portion 136 transmits the acquisition request of the weather data to the data acquiring portion 120, and acquires the weather data from the information management apparatus 200. The reordering portion 136 sets a correction value larger the shorter the walking distance according to the walking distance in the raining region based on the acquired weather data and the path information of the candidate list. The reordering portion 136 adds (or subtracts) the correction value to the information on each service providing place, and sets a high priority in the order of large (or small) value. In the above case, the candidate list reordered by the reordering portion 136 is reordered in the order of being less susceptible to rain.

The list generating portion 122 can generate the candidate list in which the information on the service providing place is reordered according to the search condition specified by the user by including the reordering portion 136. In the above description, an example of setting the priority when the condition related to the weather is specified as the search condition is described, but is not limited thereto. For instance, if the search condition of using the bicycle as the transportation means is specified, the priority can be set depending on the presence of parking. The reordering portion according to the embodiment of the present invention is not limited to setting the priority based on one search condition, and may set the priority based on two or more search conditions.

The supplementary information adding portion 140 adds information other than the service information such as the information on the facility in the service providing place, and the information on the eating and drinking place near the service providing place to the candidate list. Therefore, "supplementary information" shown in FIG. 2 is recorded in the candidate list. The supplementary information adding portion 140 transmits an acquisition request of the supplementary information to the data acquiring portion 120 to acquire the supplementary information from the information management apparatus 200.

As the supplementary information is added, the user can select the service providing place replete with eating and drinking place from the service providing places in the presentation list. Therefore, the list generating portion 122 can aid the selection of the service providing place by the user by including the supplementary information adding portion 140.

The reservation information adding portion 142 transmits an acquisition request of the availability data to the data acquiring portion 120 to acquire the availability data from the information management apparatus 200. The reservation information adding portion 142 adds the reservation information indicating the availability such as vacant seat status of the cinema to the candidate list based on the acquired availability data. Therefore, the "reservation information" shown in FIG. 2 is recorded in the candidate list.

As the reservation information is added, the user can select the service providing place with greater number of vacant seats from the service providing places in the presentation list. Therefore, the list generating portion 122 can aid the selection of the service providing place by the user by including the reservation information adding portion 142.

The list generating portion 122 can generate the presentation list as shown in FIG. 2 by the configuration described above.

The service reservation setting portion 124 reserves the content or the event in the presentation list specified by the operation input signal based on the operation input signal transmitted from the operation portion 112 according to the user input. The service reservation setting portion 124 can (indirectly) make the reservation by transmitting a reservation request to the information management apparatus 200 via the communication portion 102, but is not limited thereto. The service reservation setting portion 124 can also make the reservation by directly communicating with the server of the service provider. In this case, the service reservation setting portion 124 can perform the payment process using credit car number, electronic money, and the like.

The service reservation setting portion 124 records the information (e.g., delivery data of the reserved ticket) of the reservation result transmitted from the information management apparatus 200 in response to the reservation request in the storage portion 108 (e.g., reservation information 148 of FIG. 1). For instance, if the reservation information 148 serving as the delivery data of the reserved ticket is recorded in the storage portion 108, the user does not have to worry about vacant seats, and merely needs to go to the service providing place according to the presentation list to receive the service.

Furthermore, the service reservation setting portion 124 can cancel the reservation by transmitting a cancel request of the reserved service to the information management apparatus 200 via the communication portion 102. The service reservation setting portion 124 can transmit the cancel request when a time of a predetermined time before the service provision start time has elapsed based on the information on the service providing place in the presentation list, the reservation information 148 stored in the storage portion 108, and the time information generated by the clock 168, but is not limited thereto.

The control portion 106 can generate the presentation list recorded with the information on the service providing place adapted to the search condition based on the input search condition and the provision start time of the service by including the data acquiring portion 120 and the list generating portion 122. The control portion 106 can also reserve/cancel the reservation of the service included in the presentation list by further including the service reservation setting portion 124 described above.

The control portion 106 can record the generated presentation list in the storage portion 108. The recordation of the generated presentation list can be carried out when the process in the list generating portion 122 is completed, but is not limited thereto. For instance, the control portion 106 may record the list after the process in the second setting portion 134 (after third phase), and add the supplementary information and the like on the recorded presentation list.

The storage portion 108 is a storage means arranged in the information processing apparatus 100. The storage portion 108 is stored with the presentation list, the reservation information and the like recorded by the control portion 106, but is not limited thereto. The information processing apparatus 100 can store the map data, the traffic data, the weather data acquired from the information management apparatus 200, or various data such as application executable by the control portion 106 in the storage portion 108. In FIG. 1, an example where a presentation list A144, a presentation list B146, and the reservation information 148 are stored in the storage portion 108 is shown.

The storage portion 108 may be a magnetic recording medium such as hard disk, or a non-volatile memory such as EEPROM, flash memory, MRAM, FeRAM, and PRAM, but is not limited thereto.

The display portion 110 is a display means arranged in the information processing apparatus 100, and displays the presentation list generated by the control portion 106, the presentation list stored in the storage portion 108, and various screens such as the operation screen for the operation of the operation portion 112 displayed by the control portion 106. The display portion 110 may be an LCD, an organic EL display, and the like, but is not limited thereto.

The operation portion 112 is an operation means of the information processing apparatus 100 enabling a predetermined operation by the user. As the information processing apparatus 100 includes the operation portion 112, the user can perform the input operation of the search condition, the reservation setting input operation on the service shown in the presentation list, and the like so that the operation desired by the user is performed on the information processing apparatus 100. The operation portion 112 may be an operation input device such as keyboard and mouse, a rotatable selector such as button, direction key, and jog dial, or a combination thereof, but is not limited thereto. The operation portion 112 may be a portion integrated with the display portion 110 such as a touch screen.

The information processing apparatus 100 performs the processes of (1) determine search condition, (2) acquire service information, (3) generate presentation list, and (4) present information on service providing place by including the communication portion 102, the position measurement portion 104, the control portion 106, the storage portion 108, the display portion 110, and the operation portion 112, and provides to the user the information on the service providing place adapted to the search condition capable of receiving the service at the provision start time of the service.

For instance, if the user sets the specification of the title of the film, and the specification of the physical distance of within 10 Km from the current position as the search condition, the information processing apparatus 100 generates a presentation list recorded with information on the cinema (information on service providing place) within 10 Km from the position where the search is made of the cinemas showing the specified film. The information on each cinema of the presentation list may include the title of the film (correspond to "service content" of FIG. 2), the outline of the position of the cinema (e.g., 3 minutes by walk from O ■ ● station, correspond to "position of service providing place" of FIG. 2), the film showing start time of the film (e.g., 13:10—, correspond to "provision start time of service" of FIG. 2), the scheduled time of arriving at the cinema (e.g., 12:50, correspond to "scheduled arrival time" of FIG. 2), and the travel path to the cinema (correspond to path information on FIG. 2). Therefore, the user can arrive at the relevant cinema (service providing place) by the film showing time (provision start time of the service) by moving to one of the cinemas according to the information on each cinema of the presentation list.

Therefore, the information processing apparatus 100 can direct the user by the provision start time of the service provided at the service providing place by providing the information on the relevant service providing place adapted to the search condition capable of receiving the service at the provision start time of the service.

As described above, the information providing system 1000 according to the embodiment of the present invention includes the information management apparatus 200, and the information processing apparatus 100, . . . . The information management apparatus 200 stores the map data 220, the traffic data 222, the weather data 224, the service database 226, the availability data 228, and the like, and transmits various information such as the service information to the information processing apparatus based on the acquisition request from each information processing apparatus. In other words, the information management apparatus 200 can play the role of a storage (external storage device) common to each information processing apparatus.

The information processing apparatus 100 can provide to the user information on the service providing place adapted to the search condition capable of receiving the service at the provision start time of the service by performing the processes of (1) determine search condition, (2) acquire service information, (3) generate presentation list, and (4) present information on service providing place based on the search condition specified by the user. The user can arrive at the service providing place by the provision start time of the service by going to the service providing place according to the presented information on the service providing place. Therefore, the information processing apparatus can direct the user by the provision start time of the service provided at the service providing place by providing the information on the service providing place adapted to the search condition capable of receiving the service at the provision start time of the service.

Therefore, the information providing system 1000 according to the embodiment of the present invention can provide the information on the service providing place adapted to the search condition capable of receiving the service at the provision start time of the service based on the input search condition and the provision start time of the service. The information providing system 1000 can direct the user by the provision start time of the service provided at the service providing place by providing the information on the service providing place adapted to the search condition capable of receiving the service at the provision start time of the service.

[Variant of Information Providing System 1000 According to Embodiment of the Present Invention]

[1] First Variant

In the above description, a configuration in which the information processing apparatuses 100, . . . acquire various information such as the service information from the information management apparatus 200, and the information processing apparatuses 100, . . . provide the information on the service providing place adapted to the search condition capable of receiving the service at the provision start time of the service using the acquired various information is described as the information providing system 1000 according to the embodiment of the present invention. However, the information providing system according to the embodiment of the present invention is not limited thereto.

The information providing system according to the embodiment of the present invention may be configured such that various information stored by the information management apparatus such as the map data, the traffic data, the weather data, and the service database are stored in the storage portion of the information processing apparatus, and the information processing apparatus provides the information on the service providing place adapted to the search condition capable of receiving the service at the provision start time of the service using the information stored in its storage portion when the information processing apparatus is not able to communicate with the information management apparatus.

If the information providing system is configured as above, the information processing apparatus according to the first variant can perform the processes of (1) determine search condition, (2) acquire service information, (3) generate presentation list, and (4) present information on service providing place even if the information processing apparatus is not able to communicate with the information management apparatus. Therefore, the information processing apparatus according to the first variant can provide the information on the service providing place adapted to the search condition capable of receiving the service at the provision start time of the service.

The information processing apparatus according to the first variant periodically communicates with the information management apparatus 200, for example, to synchronize various information stored in the storage portion with the information stored in the information management apparatus. Therefore, the information processing apparatus according to the first variant can use the latest information synchronized before the communication with the information management apparatus may be no longer achieved, and thus effects similar to the information providing system 1000 can be obtained.

[2] Second Variant

In the above description, a configuration including the information processing apparatuses 100, . . . and the information management apparatus 200 has been described for the information providing system 1000 according to the embodiment of the present invention. However, the embodiment of the present invention is not limited to such configuration, and may adopt a configuration in which the information processing apparatus functions with the information processing apparatus alone, that is, in a stand-alone state.

In this case, the information processing apparatus according to the second variant stores in the storage portion various information such as the map data, the traffic data, the weather data, and the service database. The information processing apparatus according to the second variant performs the processes of (1) determine search condition, (2) acquire service information, (3) generate presentation list, and (4) present information on service providing place using the information stored in the storage portion. Therefore, similar to the information providing system 1000, the information processing apparatus according to the second variant can provide the information on the service providing place adapted to the search condition capable of receiving the service at the provision start time of the service.

The information processing apparatus according to the second variant may include the data update portion 210 shown in FIG. 1 Therefore, the information processing apparatus according to the second variant can maintain the various information stored in the storage portion in the latest state.

The information management apparatus 200 has been described as a component configuring the information providing system according to the embodiment of the present invention, but the embodiment of the present invention is not limited to such mode, and can be applied to computers such as PC (Personal Computer), and server.

The information processing apparatus 100, . . . has been described as a component configuring the information providing system according to the embodiment of the present invention, but the embodiment of the present invention is not limited to such mode. The embodiment of the present invention may be applied to a portable communication device such as portable telephone, a computer such as UMPC (Ultra Mobile Personal Computer), a wearable device such as a wrist watch, a portable game machine such as Play Station Portable (registered trademark), and the like.

(Program According to Embodiment of the Present Invention)

According to the program for causing the computer to function as the information processing apparatus 100 according to the embodiment of the present invention, the information on the service providing place adapted to the search condition capable of receiving the service at the provision start time of the service can be provided based on the input search condition and the provision start time of the service.

(Information Providing Method)

Figure 4:
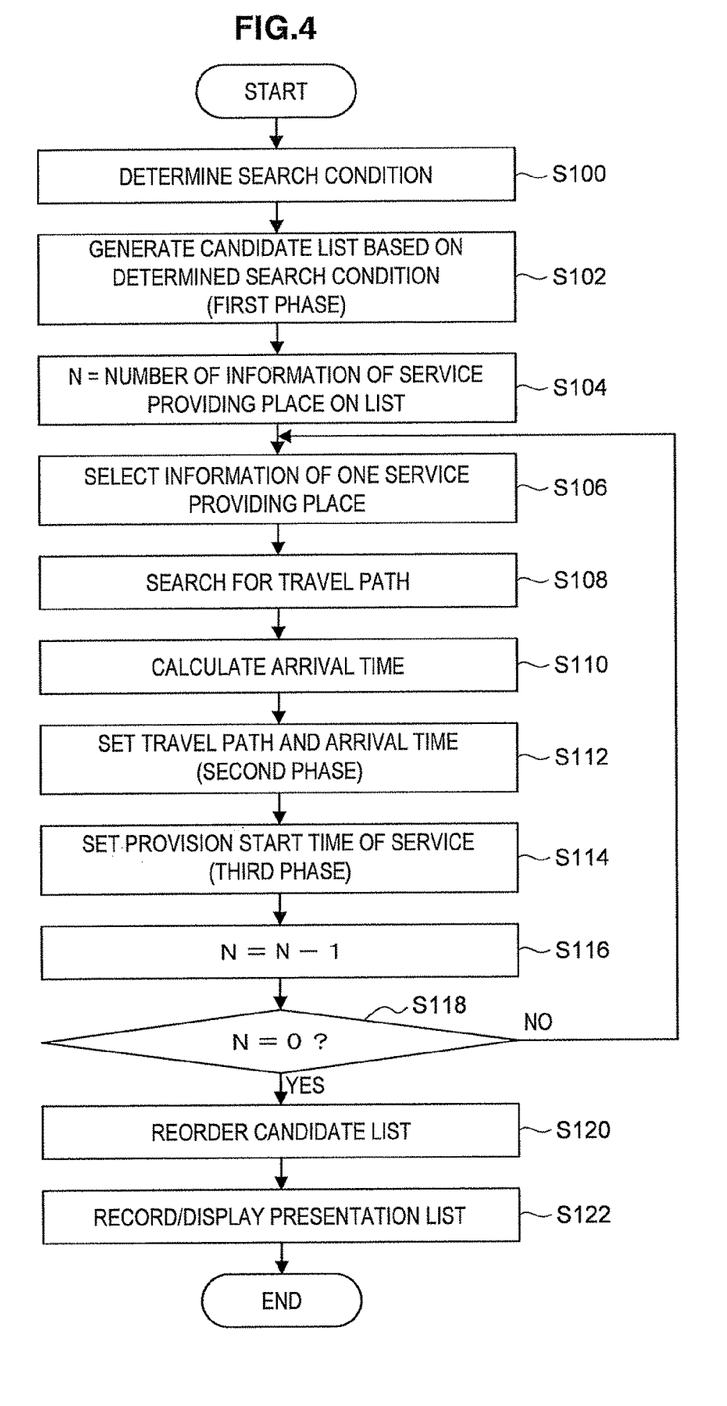
FIG. 4 is a flowchart showing one example of an information providing method according to the embodiment of the present invention.

An information providing method according to the embodiment of the present invention will now be described. FIG. 4 is a flowchart showing one example of the information providing method according to the embodiment of the present invention. FIG. 4 can be applied to the information processing apparatus according to the embodiment of the present invention, where a case of being applied to the information processing apparatus 100 will be described below by way of example.

The information processing apparatus 100 determines the search condition (S100). The information processing apparatus 100 can perform the process of step S100 based on the input signal transmitted from the operation portion 112 in response to the user operation.

The information processing apparatus 100 generates the candidate list based on the search condition determined in step S100 (step S102, first phase of generating the presentation list). The candidate list is the list that becomes the basis of the presentation list. The information processing apparatus 100 can generate the candidate list recorded with information based on the "place information", the "service content information" and the "start time information" of the acquired service information by acquiring the service information adapted to the search condition from the information management apparatus 200.

The information processing apparatus 100 sets "N=number of information on the service providing place in the candidate list" (S104). The information on one service providing place is selected from the candidate list (S106). The processes of steps S108 to S114 below are performed on the information on the service providing place selected in step S106.

The information processing apparatus 100 searches for the travel path to the service providing place from the position where the determination of the search condition is made in step S100 (S108). The information processing apparatus 100 can search for the travel path based on the search condition, the positional information, and the information on the position of the service providing place indicated by the "place information".

The information processing apparatus 100 calculates the arrival time for every travel path searched in step S108 (S110). The information processing apparatus 100 can calculate the arrival time based on the positional information, the map data, the traffic data, and the "place information" of the service information.

The information processing apparatus 100 sets the travel path and the arrival time in the information on the service providing place (S112, second phase of generating the presentation list). The information processing apparatus 100 can set the travel path and the arrival time in the information on the service providing place by selecting the travel path with the fastest arrival time, but is not limited thereto.

The information processing apparatus 100 sets the provisions start time of the service in the information on the service providing place (S114, third phase of generating the presentation list). The information processing apparatus 100 can set the provision start time of the service in the information on the service providing place by selecting the service start time capable of receiving the service at the provision start time from the "start time information" based on the arrival time set in step S112 and the "start time information" of the service information, but is not limited thereto.

The information processing apparatus 100 sets "N=N−1" (S116), and determines whether N=0 (S118). If determined as not N=0 in step S118, the information processing apparatus 100 again repeats the processes from step S106. Therefore, the information processing apparatus 100 can perform the process of the second phase of step S112, and the process of the third phase of step S114 on all the information on the service providing places contained in the candidate list generated in step S102. The candidate list performed with the process of the second phase of step S112 and the process of the third phase of step S114 is recorded with the information on the service providing place capable of receiving the service at the provision start time, and thus the candidate list after step S16 can be considered as the presentation list.

If determined as N=0 in step S118, the information processing apparatus 100 reorders the information on the service providing places contained in the candidate list (S120). The information processing apparatus 100 can perform the process of step S120 by setting the priority based on the search condition. The information processing apparatus 100 can present the information on the service providing place to the user in the order based on the search condition specified by the user, for example, by performing the process of step S120.

The information processing apparatus 100 records or displays the candidate list after step S120 as the presentation list (S122).

The information processing apparatus 100 can provide the information on the service providing place adapted to the search condition capable of receiving the service at the provisions start time of the service based on the input search condition and the provision start time of the service by using the information providing method shown in FIG. 4.

It should be understood by those skilled in the art that various modifications, combinations, sub-combinations and alterations may occur depending on design requirements and other factors insofar as they are within the scope of the appended claims or the equivalents thereof.

In the above description, a configuration of providing the information on the service providing place adapted to the search condition capable of receiving the service at the provisions start time of the service is shown as the information providing system 1000 according to the embodiment of the present invention. However, the information providing system according to the embodiment of the present invention is not limited thereto. The information providing system according to the embodiment of the present invention may have the service after the provision start time of the service as targets of provision of information by setting "condition that permits delay" (e.g., condition such as "permit O ■ ● minutes from the start") as the search condition.

The information providing system according to the embodiment of the present invention may warn the user even if the service can be received at the provision start time of the service, if the time difference between the provision start time of the service and the arrival time to the service providing place is within a predetermined range. The warning method may be having the information processing apparatus display a warning message on the display portion, color-coding the information on the service providing place to discriminate from the information on other service providing places, and the like but is not limited thereto.

The above-described configurations merely show one example of the embodiment of the present invention and thus obviously fall within the technical scope of the invention.

What is claimed is:

1. An information processing apparatus capable of communicating with an information management apparatus storing service information including place information defining a service providing place where a service is provided, service content information defining content provided at the service providing place or an event held at the service providing place, and start time information defining a start time of the content provided at the service providing place or of the event held at the service providing place, the information processing apparatus comprising:

a communication portion to communicate with the information management apparatus;

a position measurement portion to measure a position and generate positional information;

a data acquiring portion to acquire, based at least in part on an input search condition, service information comprising place information and the start time information and satisfying the search condition from the information management apparatus; and a list generating portion to generate a presentation list recorded with information on the service providing place capable of providing the service at the start time based at least in part on the generated positional information, the place information and the start time information of the acquired service information, and time information defining a time the positional information is generated, wherein the information on the service providing place comprises an arrival time to the service providing place and the start time.

2. The information processing apparatus according to claim 1, wherein the list generating portion comprises:

a candidate list generating portion to generate a candidate list in which the place information and the service content information of the service providing place satisfying the search condition are recorded for every service providing place based at least in part on the acquired service information;

a path searching portion to search a travel path from a position indicated by the positional information to the service providing place indicated by the place information based at least in part on the positional information and the place information for every service providing place contained in the candidate list;

an arrival time calculating portion to calculate an arrival time to the service providing place for every travel path based at least in part on the searched travel path; and a presentation list generating portion to set a travel path, an arrival time, and a service start time capable of receiving the service at the provision start time for every service providing place contained in the candidate list based at least in part on the calculated arrival time and the start time information of the acquired service information, and to generate the presentation list.

3. The information processing apparatus according to claim 2, wherein the presentation list generating portion comprises:

a first setting portion to select a travel path and an arrival time for every service providing place based at least in part on the arrival time calculated in the arrival time calculating portion, and to set the selected travel path and the arrival time in the candidate list; and a second setting portion to set the service start time capable of receiving the service at the start time in the candidate list based at least in part on the arrival time selected in the first setting portion and the start time information of the acquired service information.

4. The information processing apparatus according to claim 3, wherein the presentation list generating portion further comprises a reordering portion to set a priority based at least in part on the search condition, and to reorder information on the service providing place contained in the presentation list.

5. The information processing apparatus according to claim 1, wherein the list generating portion further comprises a supplementary information adding portion to acquire information other than the service information corresponding to each service providing place contained in the presentation list as supplementary information from the information management apparatus, and further to add the supplementary information to the information on the service providing place recorded in the presentation list.

6. The information processing apparatus according to claim 1, wherein the list generating portion further comprises a reservation information adding portion to acquire availability data indicating an availability of the content or the event corresponding to a service start time of each service providing place contained in the presentation list from the information management apparatus, and to add reservation information indicating an availability to the information on the service providing place recorded in the presentation list based at least in part on the availability data.

7. The information processing apparatus according to claim 1, further comprising a reservation setting portion to make a reservation of the content or the event corresponding to a service start time of the service providing place contained in the presentation list.

8. The information processing apparatus according to claim 1, further comprising a display portion to display the presentation list.

9. The information processing apparatus according to claim 1, further comprising an operation portion enabling input of the search condition.

10. The information processing apparatus according to claim 1, further comprising a storage portion to store the service information including place information defining a service providing place where a service is provided, service content information defining a content provided at the service providing place or a content of an event held at the service providing place, and start time information defining a start time of the content provision at the service providing place or of the event held at the service providing place; wherein
the data acquiring portion acquires the service information from the storage portion based at least in part on the input search condition if the service information is not acquired from the information management apparatus.

11. An information providing method used in an information processing apparatus capable of communicating with an information management apparatus storing service information including place information defining a service providing place where a service is provided, service content information defining content provided at the service providing place or an event held at the service providing place, and start time information defining a start time of the content provided at the service providing place or of the event held at the service providing place; the information providing method comprising the steps of:
acquiring, based at least in part on an input search condition, service information from the information management apparatus, wherein the service information comprises place information and the start time information and satisfies the search condition;
measuring a position and generating positional information; and
generating a presentation list recorded with information on the service providing place capable of providing the service at the start time based at least in part on the generated positional information, the place information and the start time information of the acquired service information, and time information defining a time the positional information is generated, wherein the information on the service providing place comprises an arrival time to the service providing place and the start time.

12. A program stored in a non-transitory computer readable medium used in an information processing apparatus capable of communicating with an information management apparatus storing service information including place information defining a service providing place where a service is provided, service content information defining content provided at the service providing place or an event held at the service providing place, and start time information defining a start time of the content provided at the service providing place or of the event held at the service providing place; the program causing a computer to execute the steps of:
acquiring, based at least in part on an input search condition, service information from the information management apparatus, wherein the service information comprises place information and the start time information and satisfies the search condition;
measuring a position and generating positional information; and
generating a presentation list recorded with information on the service providing place capable of providing the service at the start time based at least in part on the generated positional information, the place information and the start time information of the acquired service information, and time information defining a time the positional information is generated, wherein the information on the service providing place comprises an arrival time to the service providing place and the start time.

13. An information providing system comprising an information management apparatus and an information processing apparatus capable of communicating with the information management apparatus; wherein
the information management apparatus includes:
a management side communication portion for communicating with the information processing apparatus;
a storage portion to store service information including place information defining a service providing place where a service is provided, service content information defining a content provided at the service providing place or an event held at the service providing place, and start time information defining a start time of the content provided at the service providing place or of the event held at the service providing place;
a data extracting portion to extract the service information from the storage portion based at least in part on an acquisition request transmitted from the information processing apparatus; and
a data transmission control portion to transmit the extracted service information to the information processing apparatus, and
the information processing apparatus includes:
a communication portion to communicate with the information management apparatus;
a position measurement portion to measure a position and generating positional information;
a data acquiring portion to, based at least in part on an input search condition, transmit the acquisition request of the service information corresponding to the search condition to the information management apparatus, and acquire the service information comprising place information and the start time information and corresponding to the acquisition request from the information management apparatus; and
a list generating portion to generate a presentation list recorded with information on the service providing place capable of providing the service at the start time based at least in part on the generated positional information, the place information and the start time information of the acquired service information, and time information defining a time the positional information is generated, wherein the information on the service providing place comprises an arrival time to the service providing place and the start time.

* * * * *